United States Patent

[11] 3,592,414

[72] Inventors Felix Aulehla;
 Gunter Broll; Gerhard Kopp, all of Munich, Germany
[21] Appl. No. 763,110
[22] Filed Sept. 27, 1968
[45] Patented July 13, 1971
[73] Assignee Entwicklungsring Sud GmbH
 Munich, Germany
[32] Priority Oct. 2, 1967
[33] Germany
[31] P 1,531,399.2

[54] VARIABLE CONTOUR AIRCRAFT TAIL CONE ASSEMBLY
 3 Claims, 11 Drawing Figs.

[52] U.S. Cl. ....................................................... 244/55
[51] Int. Cl. ....................................................... B64d 29/04
[50] Field of Search ........................................... 244/53, 54, 55, 129, 130

[56] References Cited
 UNITED STATES PATENTS
 3,409,250 11/1968 Ammer et al. ................ 244/52
 3,442,471 5/1969 Fischer et al. ................ 244/53
 FOREIGN PATENTS
 1,029,106 5/1966 Great Britain ................ 244/55

*Primary Examiner*—Milton Buchler
*Assistant Examiner*—Steven W. Weinrieb
*Attorney*—William K. Serp

ABSTRACT: A tail cone assembly is located between two adjacent variable area engine nozzles. The assembly includes a plurality of panels mounted upon the ventral surface of the tail and located between the nozzles. The panels are provided with means causing their relative moment so as to provide an adjustable relatively smooth transition between the exterior surface of the tail and the nozzle.

VARIABLE CONTOUR AIRCRAFT TAIL CONE ASSEMBLY

BACKGROUND OF THE INVENTION

This invention generally relates to a variable contour airplane tail cone assembly. With respect to the illustrated embodiment the tail cone assembly is located between two adjacent variable-area engine nozzles, which are particularly suitable for use with vertical take off and landing (VTOL) and short takeoff and landing (STOL) aircraft.

Jet engines for high-performance aircraft are frequently designed so that the nozzle area varies directly with the amount of reheat used. With respect to aircraft having a fixed airframe, a region of airflow separation is formed which considerably increases the overall aircraft drag especially in the subsonic flight range. The drag is particularly noticeable at nozzle openings other than maximum. This problem is especially apparent with respect to twin-engine or multiple-engine aircraft. It is the object of the present invention to reduce drag with aircraft having adjustable nozzles. Serving to reduce such drag is a means which provides an elastic, variable-contour, exterior surface about the aircraft adjacent to the tail in accordance with prevailing nozzle configurations.

The features of the illustrated embodiment result in an optimum aerodynamic adaptation of the fuselage surfaces adjacent to the nozzle to varying nozzle configurations. In this manner the unfavorable separation region previously mentioned is to a great extent reduced. To accomplish this feature the embodiment includes variable-contour sections in the form of panels which assure an optimum tail cone configuration. Further the dorsal surfaces of the variable tail cone assembly are capable of swiveling, and move so as to vacate the envelope, between the nozzles, which the latter occupy in their expanded position. With respect to an alternate embodiment, it is proposed that the nozzle panels include both swiveling and sliding features. Alternatively the panels may be located upon the ventral surface of the tail assembly between the nozzles and adapted to swivel about an axis parallel to the aircraft centerline.

Other features and advantages of this invention will become apparent with reference to the following description and accompanying drawings which show illustrative embodiments of this invention.

DESCRIPTION OF THE PREFERRED EMBODIMENTS

Figure 1:
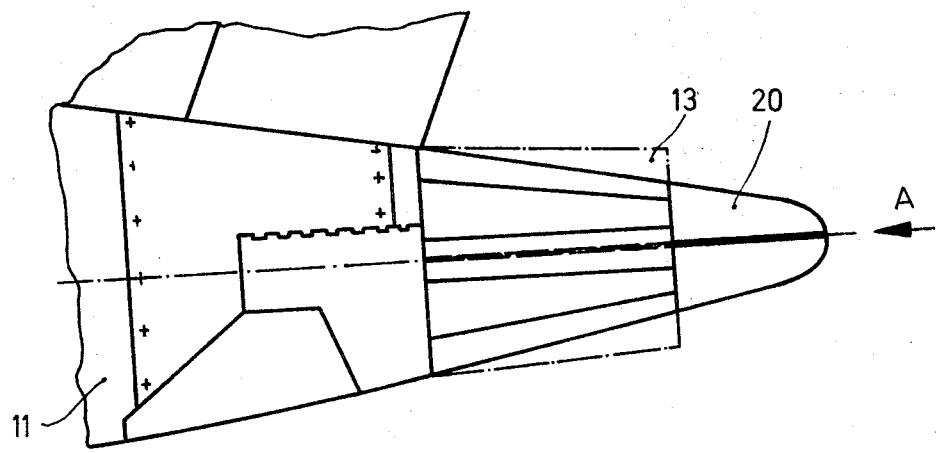
FIG. 1 is a side view of an aircraft tail cone assembly having an expandable nozzle with the nozzle in its expanded position illustrated in phantom.
Figure 2:
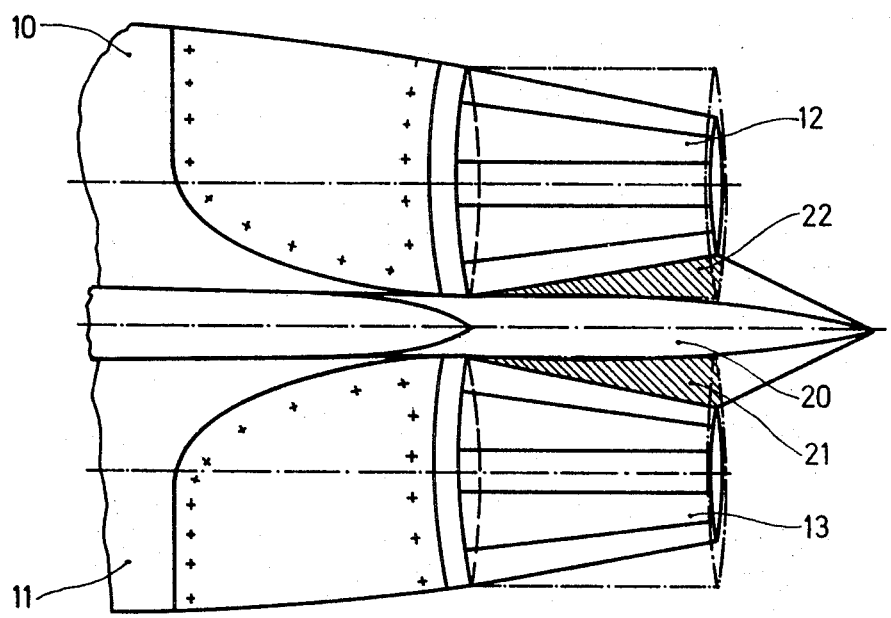
FIG. 2 is a top view of the nozzle configuration illustrated in FIG. 1.
Figure 3:
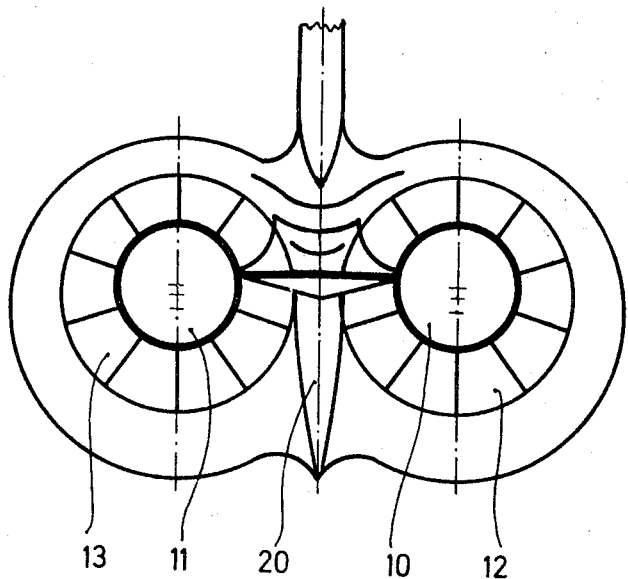
FIG. 3 is an end view taken along arrow A of FIG. 1.

With respect to FIGS. 1 through 3 an aircraft tail cone assembly is illustrated wherein the engines are aligned with their longitudinal axes parallel. The engines are equipped with deflecting nozzles, 12, 13 constructed to provide a selectively variable discharge area as will subsequently be further described. The nozzles 12, 13 are illustrated in their closed positions displaying the smallest discharge areas. The intervening areas 21, 22 are designated by crosshatching in FIG. 2. This area, which is defined between the fuselage tail assembly 20 and nozzles 12 and 13, creates the previously mentioned separation region, which increases the overall aerodynamic drag upon the aircraft, especially during subsonic flight. The illustrated embodiment includes a variable contour tail cone assembly 20, wherein the spaces 21 and 22 are covered by panels or other, preferably elastic, variable contour, folding telescoping components which slide relative to each other or alternately swivel. Thus a continuous transitional surface is created which adapts to the prevailing nozzle configuration.

Figure 4:
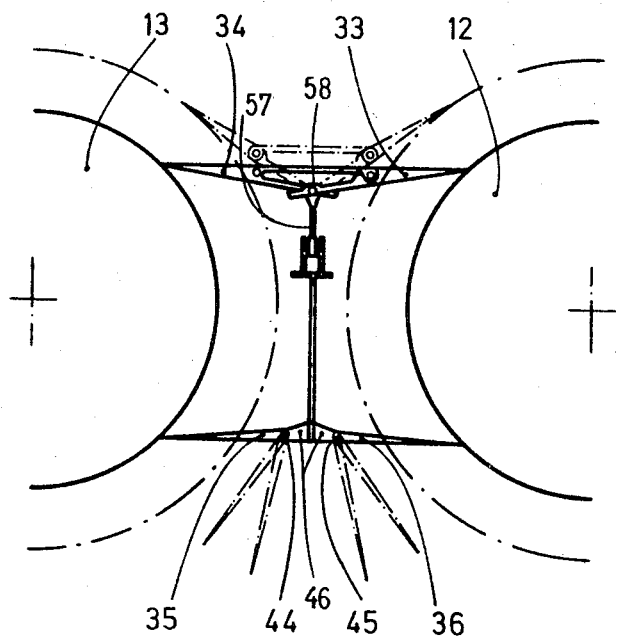
FIG. 4 is an end view taken along arrow B of FIG. 5.
Figures 5, 6:
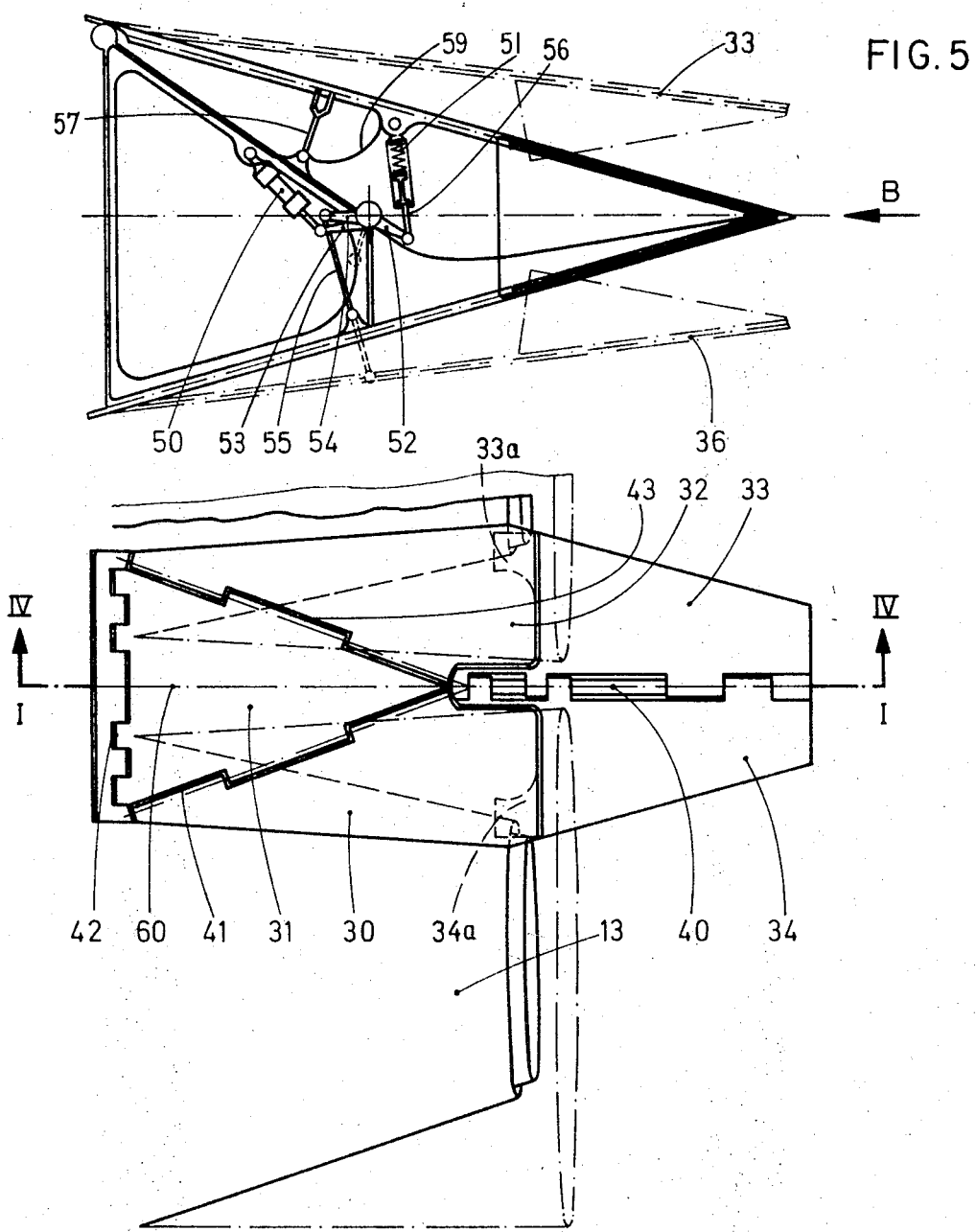
FIG. 5 is a partial enlarged view of a portion of the assembly illustrated in FIG. 4.
FIG. 6 is a top view of the assembly illustrated in FIG. 5.
Figure 7:
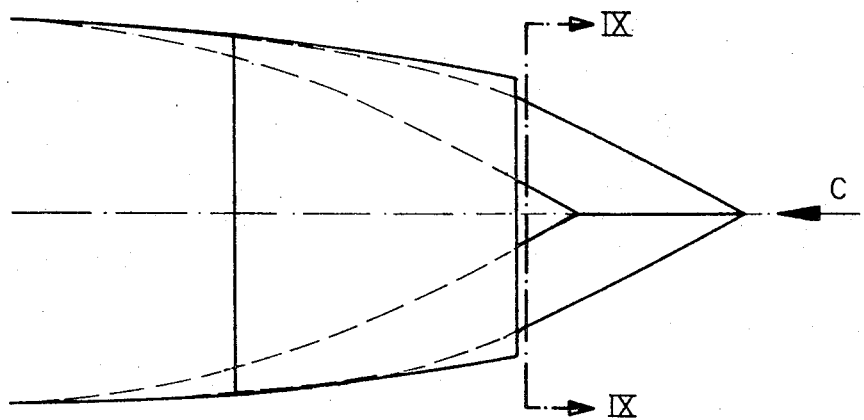
FIG. 7 is a schematic side view of a tail assembly illustrating an alternate embodiment of this invention.
Figure 8:
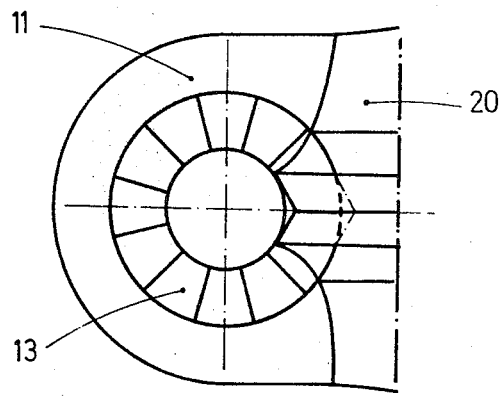
FIG. 8 is a partial end view of the tail assembly taken along the arrow C of FIG. 7.
Figure 9:
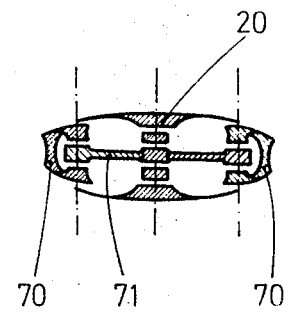
FIG. 9 is a section view taken along the line IX–IX of FIG. 7.

The stern 20 of the fuselage is formed according to the invention by flaps 30—36, as shown in FIGS. 3—6 whereby each of the flaps 33 or 34 is hinged to the corresponding flap 30 or 32 by means of connections 33a or 34a. The axes of the hinges 40, 41 and 43 are firmly connected with the upper part 31 and the part 31 is swivelable by hinge 42 which lies transversely to the direction of flight. On the lower side of the stern 20 of the fuselage, as shown in FIG. 4, there are only two swivelable flaps 35 and 36, which are mounted for rotation around the hinge axes 44, 45 in the longitudinal direction of the airplane, whereby these hinge axes 44, 45 are themselves pivotable about an axis lying transversely to the direction of flight on a hinge similar to hinge 42.

The drive of the flaps 30—36 of the stern of the fuselage is accomplished by the centrally located hydraulic or pneumatic cylinder 50 which drives lever 53, whereby levers 52 and 54, which are connected with torsional strength with the lever 53, move the upper part 31 or the lower part 46 via the rod system 55 and 56. Upon swiveling of the upper part 31, the common articulating point 58 of the flaps 33, 34 will be held fast by the lever 57, as a result of which the swiveling movement of the flaps 33, 34 around the axes 41, 43 of the hinges relative to flap 31 will result. The control spring 51 in the control cylinder 56 permits a no-load stroke of the driving lever 52 whenever the final position of the swiveling movement of the upper part 31 has been reached through the limiting cable 59 of the final positions. Further lift of the driving cylinder 50 is still needed for the movement of the lower part 46.

Figure 10:
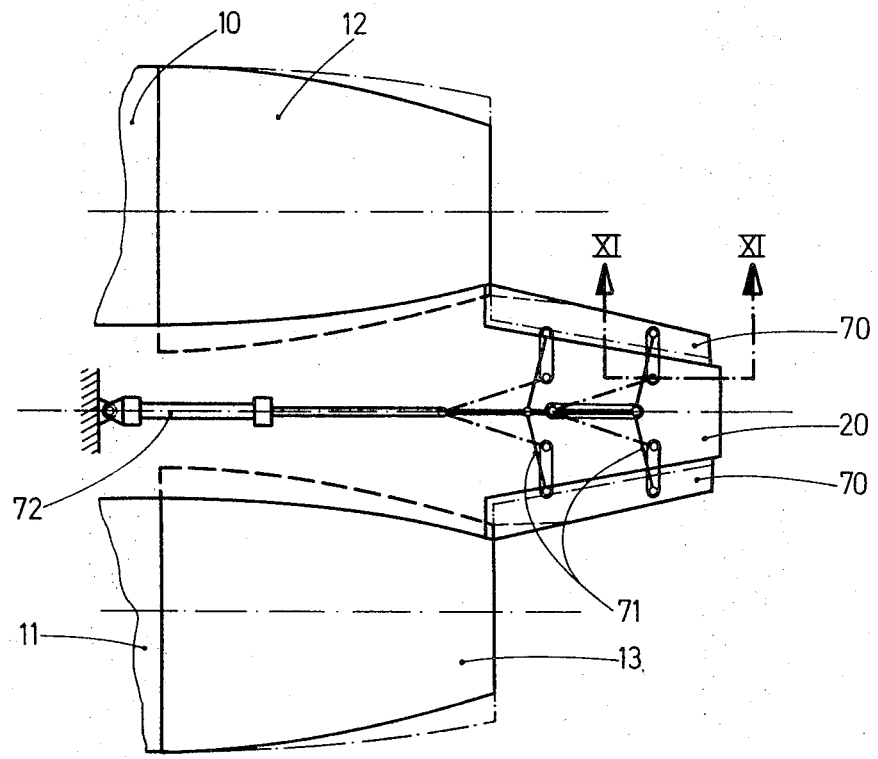
FIG. 10 is a plan view of still another illustrative embodiment of this invention.
Figure 11:
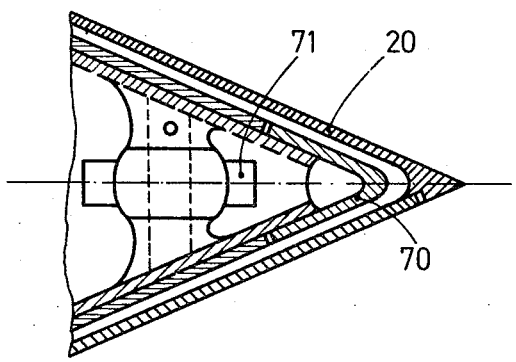
FIG. 11 is a sectional view taken along the line XI–XI of FIG. 10.

Another embodiment of the variable contour tail cone assembly of this invention is shown in FIGS. 7—11. As best shown in FIG. 10, the embodiment includes slides 70 which are received in mating relationship on each side of the tail cone 20. The slides 70 slide on the tail cone 20 toward and away from the engine nozzles 12 and 13 to adjustably span the gap between the tail cone in coordination to the variable opening adjustment of the engine nozzles. The sliding movement of the slides 70 is effected by the reciprocating cylinder 72 and toggle links 71. The operation of the cylinder 72 is coordinated by suitable control means with the nozzle-actuating means.

We claim:

1. In an aircraft employing engines having variable nozzles, said nozzles each forming the rearmost outlet for said engines and being symmetrically variable, a tail cone assembly of variable external surface configuration particularly adapted to prevent the formation of a separation region adjacent the tail assembly and the symmetrically variable nozzles comprising, sections forming part of said tail assembly and movably mounted thereon for pivotal movement about an axis substantially parallel to the longitudinal axis of the aircraft between said tail assembly and said nozzles, means for moving said sections to vary the external surface configuration of said tail assembly in cooperation with the movement of the symmetrically variable nozzles to thereby provide a relatively smooth transition between the exterior surface of the tail assembly and the nozzles.

2. The assembly according to claim 1 wherein said sections comprise a first articulated panel mounted upon the ventral surfaces of the tail assembly and a second articulated panel mounted on the dorsal surface, each of said first and second panels being articulated about an axis parallel to the longitudinal axis of said aircraft and also pivotable about an axis transverse to the longitudinal axis of the aircraft.

3. In an aircraft employing engines having variable nozzles, said nozzles each forming the rearmost outlet for said engines and being symmetrically variable, a tail cone assembly of variable external surface configuration particularly adapted to prevent the formation of a separation region adjacent the tail assembly and the symmetrically variable nozzles comprising, sections forming part of said tail assembly and movably mounted thereon for sliding movement between said tail assembly and said nozzles, means for moving said sections to vary the external surface configuration of said tail assembly in cooperation with the movement of the symmetrically variable nozzles to thereby provide a relatively smooth transition between the exterior surface of the tail assembly and the nozzles.